United States Patent Office 3,592,922
Patented July 13, 1971

3,592,922
PROCESS OF KILLING FUNGI AND NEMATODES
WITH ACETYLENIC KETONES
Dalta W. Gier and Audra M. Calhoon, Laurinburg, N.C.,
assignors to Chemagro Corporation, New York, N.Y.
No Drawing. Original application Oct. 16, 1967, Ser. No.
675,318. Divided and this application July 16, 1968,
Ser. No. 761,965
Int. Cl. A01n 9/24
U.S. Cl. 424—331                                6 Claims

ABSTRACT OF THE DISCLOSURE

Compounds of the formula

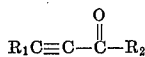

where $R_1$ is ethyl or phenyl and $R_2$ is lower alkyl, phenyl, alkylphenyl, benzyl, halophenyl, alkenyl, phenylethenyl or halophenoxymethyl are useful as nematocides and fungicides. The compound 3-heptyn-5-one is particularly valuable since it is not toxic to plants.

---

The present invention relates to fungicides and nematocides.

This application is a divisional of my copending application, Ser. No. 675,318, filed Oct. 16, 1967.

Youngson Pat. 2,905,588 discloses the use of ethynyl ketones of the formula RC≡CH where R is an acyl radical as nematocides and fungicides. These compounds are all characterized by having a hydrogen atom attached to one of the acetylenic carbon atoms. Youngson also requires the use of the relatively dangerous acetylene and the relatively expensive Grignard reagents to make his products.

It is an object of the present invention to prepare novel nematocides.

Another object is to prepare novel fungicides.

A further object is to develop fungicides and nemtocides which are not injurious to crops.

Still further objects and the entire scope of applicability of the present invention will become apparent from the detailed description given hereinafter; it should be understood, however, that the detailed description and specific examples, while indicating preferred embodimnts of the invention, are given by way of illustration only, since various changes and modifications within the spirit and scope of the invention will become apparent to those skilled in the art from this detailed description.

It has now been found that these objects can be attained by preparing α-acetylenic ketones of the formula

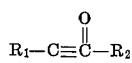

and applying them to fungi and/or nematodes. In the formula $R_1$ is ethyl or phenyl while $R_2$ is lower alkyl, phenyl, lower alkylphenyl, phenylethenyl, halophenyl, alkenyl or halophenoxymethyl. Most preferably $R_2$ is lower alkyl since in such case the products do not have significant herbicidal activity and hence can be safely used to protect crops from fungi and nematodes.

Examples of compounds useful within the invention are 3-heptyn-5-one, 3-hexyne-5-one, 6-methyl-3-heptyn-5-one, 3-octyn-5-one, 3-nonyl-5-one, 3-decyn-5-one, hept-3-yn-6-ene-5-one-7-phenyl, 3-pentyn-5-one-5-o-chloro-phenyl, 3-pentyn-5-one-5-p-bromophenyl, 3-pentyn-5-one-5-2',4'-dichlorophenyl, 3-hexyn-5-one-6-p-chlorophenoxy, 1-butyn-3-one-1-phenyl, 1-pentyn-3-one-1-phenyl, 1-pentyn-3-one-4-methyl-1-phenyl, 1-hexyn-3-one-1-phenyl, 1-heptyn-3-one-1-phenyl, 1-pentyn-3-one-1-p-tolyl, 1-hexyn-3-one-1-o-p-tolyl, 1-propyn-3-one-1,3-diphenyl, 1-butyn-3-one-1,4-di- phenyl, pent-1-yn-4-ene-3-one-1,5-diphenyl, 1-propyn-3-one-1-phenyl-3-o-chloro-phenyl, 1-propyn-3-one-1-phenyl-3 - p - chlorophenyl, 1-propyn-3-one-1-phenyl-3-2',4'-dichlorophenyl, 1-propyn-3-one-1-phenyl-3-3',4' - dichlorophenyl, 1-propyn-3-one-1-phenyl-3-2',4'-dibromophenyl, oct-3-yn-7-ene-5-one, hept-3-yn-6-ene-5-one.

The α-acetylenic ketones are prepared by reacting ethyl acetylene or phenyl acetylene with sodium or potassium or a sodium-potassium alloy and reacting the resulting alkali metal ethyl (or phenyl) acetylide with the appropriate acyl halide, e.g. acetyl chloride, acetyl bromide, propionyl chloride, propionyl bromide, butyryl chloride, isobutyryl chloride, valeryl chloride, acrylyl chloride, 3-butenoyl chloride, benzoylchloride, o-toluoyl chloride, p-toluoyl-chloride, p-chlorobenzoyl chloride, p-chlorobenzoyl chloride, p-bromobenzoyl chloride, p-bromobenzoyl bromide, 2,4-dichlorobenzoyl chloride, 3,4-dichlorobenzoyl chloride, p-chloorphenoxyacteyl chloride, phenylacetyl chloride, cinnamoyl chloride.

Illustrative of the reaction mechanism is the following series of equations:

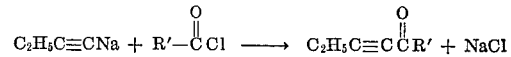

The compounds of the present invention can be used alone as fungicides and/or nematocides, but it has been found desirable to apply them to the habitat of the fungi or nematodes, together with inert solids ot form dusts or, more preferably, suspended in a suitable liquid diluent, preferably water. They can be applied at widely varying rates, e.g. 0.1–30 lbs./acre.

There can also be added surface active agents or wetting agents and inert solids in such liquid formulations. Desirably, 0.05–1% by weight of surface active or wetting agent is employed. The active ingredient can be from 0.01 to 95% by weight of the entire composition in such case.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monoethyl ether, alcohols, e.g., ethanol, methanol, isopropanol, amyl alcohol, ethylene glycol, propylene glycol, butyl carbitol acetate and glycerine. Mixtures of water and organic solvents, either as solutions or emulsions, can be employed.

The pesticides of the present invention can also be applied with fungicidal and nematocidal adjuvants or carriers such as talc, pyrophyllite, synthetic fine silica, attapulgus clay, kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

It is frequently desirable to incorporate a surface active agent in the pesticidal compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propylnaphthalene sulfonic acid, (di-2-ethylhexyl)ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyltaurate, Turkey Red Oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide-propylene oxide condensation products, e.g., Pluronic 61 (molecular weight 1000), sorbitan sesquioleate, polyethylene glycol ester of tall oil acids, sodium octyl phenoxyethoxyethyl sulfate, tris (polyoxyethylene) sorbitan monostearate (Tween 60), sodium dihexyl sulfosuccinate.

The solid and liquid formulations can be prepared by any of the conventional procedures. Thus, the active ingredient can be mixed with the solid carrier in finely divided form in amounts small enough to preserve the free-flowing property of the final dust composition.

Unless otherwise indicated all parts and percentages are by weight.

EXAMPLE 1

The following general method was employed in preparing the α-acetylenic ketones. A 500 ml. 3-neck flask equipped with a mechanical stirrer, a Dry Ice condenser and a gas inlet tube was charged with 300 ml. of dry tetrahydrofuran and the system was swept with dry nitrogen. Sodium potassium alloy (0.15 mole) was added under a nitrogen atmosphere. The gas inlet tube was replaced with a dropping funnel containing about 10% excess butyne-1 or phenylacetylene in 50 ml. of dry tetrahydrofuran. The butyne-1 or phenylacetylene was added dropwise with vigorous stirring and intermittent ice cooling to prevent overheating (the temperature was held below 50° C.). The reaciton mixture immediately turned a deep purple and gradually changed to light grey as the reaction approached completion.

When no more free metal appeared visible, the reaction mixture was chilled in a Dry Ice-acetone bath and a stoichiometric amount (based on the sodium-potassium alloy used) of the appropriate acid chloride (e.g. propionyl chloride to prepare compound 1 infra) in 50 ml. of dry tetrahydrofuran was added dropwise at Dry Ice temperature. The mixture was allowed to slowly attain room temperature and was continually stirred for an additional two hours. The slurry was then added cautiously to 1 liter of water and crushed ice. The non-aqueous layer was separated, washed with 10% aqueous sodium carbonate solution, washed again with water and then dried over calcium sulfate. The trapped solvent was removed by distillation under vacuum and the crude product purified. The liquid ketones formed were purified by vacuum distillation. The solid ketones formed were purified by recrystallization from ethanol or ethanol-water mixtures.

The α-acetylenic ketones formed are set forth in Table 1 and had the formula

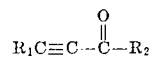

$$R_1C\equiv C-\overset{\overset{\displaystyle O}{\|}}{C}-R_2$$

TABLE 1

| Compound | $R_1$ | $R_2$ | Physical state | B.P., °C. at 3 mm. | M.P., °C. | R.I., $n_D^{29}$ | Percent, yield |
|---|---|---|---|---|---|---|---|
| 1 | Ethyl | Ethyl | Liquid | 35–37 |  | 1.3860 | 41 |
| 2 | do | Isopropyl | do | 52–55 |  | 1.4402 | 55 |
| 3 | do | n-Propyl | do | 62–64 |  | 1.4402 | 49 |
| 4 | do | Allyl | do |  |  |  |  |
| 5 | do | Tridecyl | Wax |  | 42–43 |  | 92 |
| 6 | do | Phenylethenyl | Solid |  | 114–116 |  | 26 |
| 7 | do | Benzyl | do |  | 101–103 |  | 22 |
| 8 | do | o-Chlorophenyl | Wax |  | 89–91 | 1.5650 | 26 |
| 9 | do | p-Chlorophenoxymethyl | Oil |  |  | 1.5675 | 74 |
| 10 | Phenyl | Methyl | Liquid | 110–113 |  | 1.6596 | 27 |
| 11 | do | Ethyl | do | 114–116 |  | 1.5555 | 51 |
| 12 | do | Isopropyl | do | 115–120 |  | 1.5406 | 27 |
| 13 | do | n-Propyl | do | 140–145 |  | 1.5432 | 32 |
| 14 | do | Benzyl | Wax |  | 66–68 |  | 52 |
| 15 | Ethyl | Methyl | Liquid | 37–39 |  | 1.3800 | 38 |
| 16 | Phenyl | o-Chlorophenyl | Solid |  | 101–103 |  | 46 |
| 17 | do | p-Chlorophenyl | do |  | 100–101 |  | 61 |
| 18 | do | 2,4-dichlorophenyl | do |  | 70–72 |  | 36 |
| 19 | do | 3,4-dichlorophenyl | do |  | 163–165 |  | 23 |
| 20 | do | Phenylethenyl | do |  | 60–61 |  | 29 |

EXAMPLE 2

The compounds were tested as saprophytic nematocides by adding them to water containing Panagrellus spp. and Rhabiditis spp. and the results recorded in percent kill at the indicated dosages in parts per million. A blank showed 10% kill. The results of the test are disclosed in Table 2.

TABLE 2

| Parts per million | 400 | 200 | 100 | 50 | 25 | 12.5 |
|---|---|---|---|---|---|---|
| Compound: |  |  |  |  |  |  |
| 1 | 100 | 100 |  | 100 |  |  |
| 2 |  | 100 | 80 | 80 | 50 | 50 |
| 3 |  | 100 | 100 | 100 | 100 | 100 |
| 4 |  | 100 | 100 | 80 | 40 | 10 |
| 5 |  | 50 | 30 | 10 | 10 | 10 |
| 6 |  | 50 | 30 | 10 | 10 | 10 |
| 7 |  | 100 | 80 | 50 | 30 | 10 |
| 8 | 80 | 50 |  | 30 |  |  |
| 9 |  | 100 | 100 | 80 | 50 | 30 |
| 10 | 100 | 100 |  | 100 |  |  |
| 11 | 100 | 100 |  | 100 |  |  |
| 12 | 100 | 100 |  | 100 |  |  |
| 13 | 100 | 100 |  | 100 |  |  |
| 14 | 50 | 30 |  | 10 |  |  |

In another test compound 2 (3-heptyn-5-one-6-methyl) was 100% effective at dosages ranging from 200 p.p.m. to 12.5 p.p.m.

The products were not as effective against parasitic nematocides as shown in tests against Meloidogyne spp. when applied to soil containing tomatoes having root knots. The compounds were applied as a formulation containing 50% active ingredient, 46% ultra fine silica, 2% sodium lignin sulfonate and 2% polyethylene oxide-polypropylene oxide adduct molecular weight 1000. (This formulation is identified hereinafter as Formulation A.) Compounds 3, 9 and 11 were 76% effective at 50 p.p.m. and 25 p.p.m. Compound 10 was 100% effective at 50 p.p.m. but ineffective at 25 p.p.m. The other compounds tested were not effective at dosages of 50 p.p.m. and below.

The results in Table 2 show that it is important that $R_2$ be lower alkyl for good protection, e.g. compare compound 3 ($R_2$ is n-propyl) with compound 5 ($R_2$ is tridecyl).

EXAMPLE 3

The compounds were also tested as fungicides in Agar plate tests and in soil fungicide tests. In the Agar plate tests recorded in Table 3 the compound was added to Agar containing the following fungi *Colletotrichum obiculare, Rhizoctonia solani, Fusarium lycopersici, Helminthosporium sativum* and *Verticillium alboatrum*.

In Table 3, Rate A is 1000 p.p.m., Rate B is 100 p.p.m., and Rate C is 10 p.p.m. The results are recorded on a 0 to 10 scale where 0 indicates no inhibition of growth and 10 indicates perfect inhibition of growth.

In the soil fungicide tests which are recorded in Table 4 the compounds were added as Formulation A to soil planted with pea seedlings and infested with Pythium spp. The results were recoded at rates of 200 p.p.m. and 50 p.p.m. and on a 0 to 10 scale wherein 0 indicates no inhibition and 10 indicates complete inhibition.

It will be observed from Tables 3 and 4 that the higher alkyl compound 5 ($R_2$ is tridecyl) did not show any significant fungicidal activty and the activity of compound 4 ($R_2$ is allyl) was minor.

EXAMPLE 4

The compounds were also tested as post emergent herbicides at the indicated dosages in lbs./acre. The results are set forth in Table 5.

A 0 to 10 scale was employed wherein 0 indicates no effect and 10 indicates 100% kill of the plants.

TABLE 3

| Compound | Rate | Colleto-trichum | Fusarium | Helmintho-sporium | Rhiz-octonia | Verti-cillium |
|---|---|---|---|---|---|---|
| 1 | A | 10 | 10 | 10 | 10 | 10 |
|   | B | 10 | 10 | 10 | 10 | 10 |
|   | C | 10 | 10 | 10 | 10 | 10 |
| 4 | A | 0 | 0 | 0 | 0 | 0 |
|   | B | 0 | 0 | 0 | 0 | 0 |
|   | C | 0 | 0 | 0 | 0 | 0 |
| 5 | A | 0 | 0 | 0 | 0 | 0 |
|   | B | 0 | 0 | 0 | 0 | 0 |
|   | C | 0 | 0 | 0 | 0 | 0 |
| 8 | A | 10 | 10 | 10 | 10 | 10 |
|   | B | 0 | 5 | 5 | 10 | 5 |
|   | C | 0 | 0 | 0 | 0 | 0 |
| 9 | A | ---- | 8 | 10 | 10 | ---- |
|   | B | ---- | 5 | 5 | 8 | ---- |
|   | C | ---- | 0 | 0 | 5 | ---- |
| 10 | A | 10 | 10 | 10 | 10 | 10 |
|    | B | 10 | 10 | 10 | 10 | 10 |
|    | C | 10 | 8 | 8 | 10 | 5 |
| 11 | A | 10 | 10 | 10 | 10 | 10 |
|    | B | 10 | 10 | 10 | 10 | 10 |
|    | C | 10 | 10 | 10 | 10 | 10 |
| 12 | A | 10 | 10 | ---- | ---- | ---- |
|    | B | 10 | 10 | ---- | ---- | ---- |
|    | C | 5 | 5 | ---- | ---- | ---- |
| 13 | A | 10 | 10 | 10 | 10 | 10 |
|    | B | 10 | 10 | 10 | 10 | 8 |
|    | C | 5 | 5 | 10 | 10 | 5 |
| 14 | A | 5 | 5 | 5 | 5 | 0 |
|    | B | 0 | 5 | 5 | 0 | 0 |
|    | C | 0 | 0 | 0 | 0 | 0 |

TABLE 4

| Compound | Rate | Activity |
|---|---|---|
| 1 | 200 | 10 |
|   | 50 | 9 |
| 4 | 200 | 8 |
|   | 50 | 1 |
| 5 | 200 | 0 |
|   | 50 | 0 |
| 8 | 200 | 10 |
|   | 50 | 7 |
| 9 | 200 | 8 |
|   | 50 | 2 |
| 10 | 200 | 9 |
|    | 50 | 9 |
| 11 | 200 | 10 |
|    | 50 | 9 |
| 12 | 200 | 9 |
|    | 50 | 4 |
| 13 | 200 | 9 |
|    | 50 | 4 |
| 14 | 200 | 4 |
|    | 50 | 4 |

TABLE 5

| Compound | Rate | Oats | Sugar beets | Radish | Flax | Wheat |
|---|---|---|---|---|---|---|
| 1 | 8 | 0 | 0 | 0 | 0 | 0 |
|   | 2 | 0 | 0 | 0 | 0 | 0 |
| 8 | 8 | 7 | 10 | 9 | 10 | 4 |
|   | 2 | 7 | 10 | 9 | 10 | 6 |
| 9 | 8 | 2 | 8 | 8 | 8 | 1 |
|   | 2 | 0 | 7 | 8 | 7 | 2 |
| 10 | 8 | 4 | 9 | 7 | 8 | 2 |
|    | 2 | 0 | 0 | 1 | 1 | 0 |
| 11 | 8 | 3 | 9 | 4 | 7 | 5 |
|    | 8 | 0 | 5 | 4 | 3 | 2 |
| 12 | 8 | 3 | 9 | 6 | 4 | 5 |
|    | 2 | 0 | 3 | 3 | 0 | 3 |
| 13 | 8 | 5 | 6 | 6 | 6 | 4 |
|    | 2 | 3 | 0 | 3 | 4 | 1 |

The results set forth in Table 5 illustrate the fact that the compounds where $R_2$ is lower alkyl, e.g. 1 to 4 carbon atoms are not herbicides. This is especially so when $R_1$ is ethyl. Since such compounds are not herbicides they can be safely applied to growing crops to kill fungi and nematodes infesting the crops.

What is claimed is:

1. A process of killing nematodes comprising applying to the habitat of the nematodes a nematocidally effective amount of a compound having the formula

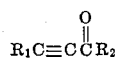

where $R_1$ is ethyl or phenyl and $R_2$ is lower alkyl, phenyl, lower alkylphenyl, phenylethenyl mono to di chloro or bromophenyl, alkenyl or mono chlorophenoxymethyl.

2. A process according to claim 1 wherein $R_1$ is ethyl.
3. A process according to claim 2 wherein $R_2$ is lower alkyl.
4. A process according to claim 1 wherein $R_1$ is phenyl.
5. A process according to claim 4 wherein $R_2$ is lower alkyl.
6. A process according to claim 1 wherein the compound is applied to a growing crop infested with the pest.

References Cited

Chelpanova et al., J. Organic Chemistry of the U.S.S.R. 2 (No. 4), 604–608 (1966).

Chopard et al., J. Organic Chemistry 30, 1015–1019 (1965).

Tanaka et al., Antibiotics and Chemotherapy 9, 151–154 (1959).

ALBERT T. MEYERS, Primary Examiner

D. M. STEPHENS, Assistant Examiner